(12) United States Patent
Hashemzadeh

(10) Patent No.: US 7,037,975 B2
(45) Date of Patent: May 2, 2006

(54) PROCESS FOR PRODUCING HIGH-SOLIDS AQUEOUS POLYMER DISPERSIONS

(75) Inventor: Abdulmajid Hashemzadeh, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 581 days.

(21) Appl. No.: 10/167,144

(22) Filed: Jun. 11, 2002

(65) Prior Publication Data

US 2002/0188062 A1    Dec. 12, 2002

Related U.S. Application Data

(63) Continuation of application No. 09/520,734, filed on Mar. 8, 2000, now abandoned.

(30) Foreign Application Priority Data

Mar. 18, 1999 (DE) ............................... 199 12 191

(51) Int. Cl.
*C08K 3/00* (2006.01)

(52) U.S. Cl. ..................... 524/831; 524/543; 524/832; 524/833; 524/834

(58) Field of Classification Search .............. 524/543, 524/831, 832, 833, 834
See application file for complete search history.

(56) References Cited

U.S. PATENT DOCUMENTS

| | | | |
|---|---|---|---|
| 4,371,659 A | 2/1983 | Druschke et al. | |
| 4,456,726 A | 6/1984 | Siol et al. | |
| 5,340,859 A | 8/1994 | Aydin et al. | |
| 5,442,006 A | 8/1995 | Aydin et al. | |
| 5,496,882 A | 3/1996 | Aydin et al. | |
| 5,498,655 A | 3/1996 | Aydin et al. | |
| 5,639,805 A | 6/1997 | Park | |
| 5,677,368 A * | 10/1997 | Dunn et al. ................. | 523/335 |
| 5,876,855 A * | 3/1999 | Wong et al. .......... | 428/355 BL |
| 5,922,626 A * | 7/1999 | Pelzer ........................ | 442/394 |
| 5,994,428 A | 11/1999 | Lutz | |

FOREIGN PATENT DOCUMENTS

| | | |
|---|---|---|
| DE | 1100958 | 3/1961 |
| DE | 1910488 | 9/1970 |
| DE | 31 09 085 | 2/1982 |
| DE | 3443964 | 6/1986 |
| DE | 4 136 993 | 5/1993 |
| EP | 0 037 923 | 10/1981 |
| EP | 0065253 | 11/1982 |
| EP | 0120265 | 10/1984 |
| EP | 0136649 | 4/1985 |
| EP | 0 081 083 | 3/1988 |
| EP | 0313 314 | 4/1989 |
| EP | 0 567 831 | 11/1993 |
| EP | 0 554 832 | 7/1996 |
| EP | 0 567 819 | 9/1996 |
| EP | 0 568 831 | 9/1996 |
| EP | 0 568 834 | 11/1996 |
| EP | 0 567 811 | 7/1997 |
| EP | 0 784 060 | 7/1997 |
| EP | 0 812 103 | 12/1997 |
| GB | 1261672 | 1/1972 |
| WO | WO 96/11234 | 4/1996 |

OTHER PUBLICATIONS

Derwent Abstract corresponding to DE 3443964 [AN 1986-151284].
Derwent Abstract corresponding to DE 1100958 [AN 1961: 134773].
Derwent Abstract corresponding to DE 3109085 [AN 1981-684890].
Derwent Abstract corresponding to DE 4136993 [AN 1993-160193].
Derwent Abstract corresponding to EP 065 253 [AN 1982-02607].
Derwent Abstract correspoding to EPO 567 831 [AN 1993-346290].
Fox T.G., Bull. Am. Physics Soc., 1, 3, p. 123 (1956).
Plymer Handbook, 2nd Edition, J. Wiley R Sons, New York, NY (1975).

* cited by examiner

Primary Examiner—Edward J. Cain
(74) Attorney, Agent, or Firm—Brooks Kushman P.C.

(57) ABSTRACT

The invention provides a process for preparing aqueous polymer dispersions having a high solids content of more than 60% by polymerizing one or more ethylenically unsaturated monomers by means of free-radically initiated aqueous emulsion polymerization in the presence of from 0.1 to 5.0% by weight of emulsifier, based on the overall weight of the monomers, and in the presence of initiator, wherein the emulsifier in an amount of from 0.001 to 0.5% by weight, based on the overall weight of the water in the initial charge, is included in the initial charge together with a fraction of from 1 to 10% by weight of the monomers, based on the overall weight of the monomers, before the beginning of polymerization, and the remainder of emulsifier and the remainder of monomers are metered in after the beginning of polymerization.

16 Claims, No Drawings

PROCESS FOR PRODUCING HIGH-SOLIDS AQUEOUS POLYMER DISPERSIONS

This application is a continuation of application Ser. No. 09/520,734 filed on Mar. 8, 2000 now abandoned.

FIELD OF THE INVENTION

The invention relates to a process for producing aqueous polymer dispersions having a high solids content of more than 60% by polymerizing one or more ethylenically unsaturated monomers by means of free-radically initiated aqueous emulsion polymerization in the presence of emulsifiers and initiators.

BACKGROUND OF THE INVENTION

Aqueous polymer dispersions are used in a large number of applications: for example, as base materials for paints, coatings, and adhesives, as laminating agents for paper, or as additives to building materials. Most dispersions have a solids content of from 45 to 60% by weight. At higher solids content, the viscosity rises sharply as the solids content increases. The high viscosities not only have a negative effect on processability, but rather, the high viscosity may result in coagulation of the dispersion, or in the formation of gel specks, even during polymerization.

A number of processes are known from the prior art for the preparation of highly concentrated polymer dispersions of relatively low viscosity, the majority of these processes using seed latices in order to obtain high solids contents.

EP-A 784060 relates to a process for preparing polymer dispersions having a high solids content of more than 67%, in which carboxyl-functional monomers are polymerized with further ethylenically unsaturated monomers in the presence of emulsifier and where further emulsifier is added at a monomer conversion of from 40 to 60%. WO-A 96/11234 describes a procedure in which seed latex is included in the initial charge, up to a weight fraction of 80%, and the rest of the monomer is metered in during the polymerization, without the addition of further emulsifier. In EP-A 81083 (U.S. Pat. No. 4,456,726) two polymer latices of different particle size are included in the initial charge and the monomers are polymerized subsequently. In EP-A 554832, the procedure used to prepare highly concentrated polymer dispersions involves preparing the monomers in the presence of a hydrophobic polymer and in the presence of a copolymerizable emulsifier.

The patent applications EP-A 567811 (U.S. Pat. No. 5,496,882), EP-A 567819 (U.S. Pat. No. 5,498,655), EP-A 568831 (U.S. Pat. No. 5,442,006) and EP-A 568834 (U.S. Pat. No. 5,340,859) relate to a very complicated processes for preparing highly concentrated dispersions. In EP-A 567811 an extremely finely divided latex is included at least in part in the initial charge and the monomers are polymerized under very complex process conditions. In EP-A 567819, a seed latex mixture comprising latex particles of up to 400 nm in size and latex particles of up to 100 nm in size is included in the initial charge and the monomers are polymerized under complex process conditions. EP-A 567831 relates to a process for preparing highly concentrated dispersions in which a coarsely particulate latex is included in the initial charge and a finely divided latex is metered along with the monomers. EP-A 568834, finally, relates to a process in which two seed latices, of which one includes both coarsely particulate and finely divided polymer particles, are included in the initial charge and the monomers are metered in.

Common features of the processes known to date in the prior art are that relatively complex processes are used, often in combination with a laborious seed latex technique, in order to obtain highly concentrated polymer dispersions. The object was therefore to provide a process with which dispersions virtually free of gel specks and having a solids content of more than 60% are obtainable without the need to use seed latex.

The invention provides a process for preparing aqueous polymer dispersions having a high solids content of more than 60% by polymerizing one or more ethylenically unsaturated monomers by means of free-radically initiated aqueous emulsion polymerization in the presence of from 0.1 to 5.0% by weight of emulsifier, based on the overall weight of the monomers, and in the presence of initiator, wherein the emulsifier in an amount of from 0.001 to 0.5% by weight, based on the overall weight of the water in the initial charge, is included in the initial charge together with a fraction of from 1 to 10% by weight of the monomers, based on the overall weight of the monomers, before the beginning of polymerization, and the remainder of emulsifier and the remainder of monomers are metered in after the beginning of polymerization.

Suitable monomers are one or more from the group of the vinyl esters of branched or unbranched carboxylic acids having from 1 to 12 carbon atoms, the esters of acrylic acid and methacrylic acid with branched or unbranched alcohols having 1 to 12 carbon atoms, vinylaromatics, vinyl halides, olefins, and dienes.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 carbon atoms, an example being VeoVa9® or VeoVa10® (trade names of Shell). Vinyl acetate is particularly preferred.

Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, and 2-ethylhexyl acrylate. Particular preference is given to methyl acrylate, methyl methacrylate, ethyl acrylate, n-butyl acrylate, and 2-ethylhexyl acrylate.

Preferred vinyl aromatics are styrene, methyl styrene, and vinyl toluene. The preferred vinyl halide is vinyl chloride. The preferred olefins are ethylene and propylene and the preferred dienes are 1,3-butadiene and isoprene.

If desired it is also possible to copolymerize from 0.05 to 10% by weight of auxiliary monomers, based on the overall weight of the monomer mixture. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; monoesters and diesters of fumaric acid and maleic acid such as the diethyl and diisopropyl esters, and also maleic anhydride, ethylenically unsaturated sulfonic acids and salts thereof, preferably vinylsulfonic acid or 2-acrylamido-2-methylpropane sulfonic acid.

Further examples are precrosslinking comonomers such as ethylenically polyunsaturated comonomers, examples being divinyl adipate, diallyl maleate, allyl methacrylate and triallyl cyanurate, or postcrosslinking comonomers, examples being acrylamidoglycolic acid (AGA), methylacrylamidoglycolic acid methyl ester (MAGME), N-methylolacrylamide (NMA), N-methylolmethacrylamide, N-methylolallylcarbamate, alkyl ethers such as the isobutoxy ether or esters of N-methylolacrylamide, of N-methylolmethacrylamide and of N-methylolallylcarbamate. Also suitable are epoxy-functional comonomers such as glycidyl methacrylate and glycidyl acrylate. Further examples are silicon-functional comonomers, such as acryloxypropyl-tri (alkoxy)- and methacryloxypropyltri(alkoxy)-silanes, vinyl-trialkoxysilanes and vinylmethyldialkoxysilanes, possible examples of alkoxy groups present being ethoxy and ethoxypropylene glycol ether radicals. Mention may also be made of monomers having hydroxyl or CO groups, examples being hydroxyalkyl acrylates and methacrylates such as hydroxyethyl, hydroxypropyl or hydroxybutyl acrylate or methacrylate and also compounds such as diacetone acrylamide and acetylacetoxyethyl acrylate or methacrylate.

The most preferred auxiliary monomers are ethylenically unsaturated mono- and dicarboxylic acids, preferably acrylic acid, methacrylic acid, fumaric acid and maleic acid; ethylenically unsaturated carboxamides, preferably acrylamide and methacrylamide; and ethylenically unsaturated monomers having hydroxyl groups, preferably hydroxyethyl, hydroxypropyl or hydroxybutyl acrylate or methacrylate.

In the copolymers, the amounts in percent by weight add up in each case to 100% by weight. In general, the monomers and/or the weight fractions of the comonomers are/is selected so as to give a glass transition temperature Tg of from −70° C. to +100° C., preferably from −65° C. to +50° C. The glass transition temperature Tg of the polymers can be determined in a known manner by means of differential scanning calorimetry (DSC). The Tg can also be calculated approximately in advance by means of the Fox equation. According to Fox T. G., Bull. Am. Physics Soc. 1, 3, page 123 (1956) the following is true: $1/Tg = x_1/Tg_1 + x_2/Tg_2 + \ldots + x_n/Tg_n$, where $x_n$ represents the mass fraction (% by weight/100) of the monomer n and $Tg_n$ is the glass transition temperature, in Kelvin Degrees, of the homopolymer of the monomer n. Tg values for homopolymers are listed in Polymer Handbook 2nd Edition, J. Wiley & Sons, New York (1975).

Particular preference is given to monomers and monomer mixtures which lead to homopolymers or copolymers listed below, the amounts in percent by weight, together with the auxiliary monomer fraction if appropriate, adding up to 100% by weight:

From the group of the vinyl ester polymers, vinyl acetate-ethylene copolymers having an ethylene content of from 1 to 60% by weight; vinyl acetate-acrylate copolymers with from 1 to 60% by weight of acrylate, especially n-butyl acrylate or 2-ethylhexyl acrylate, with or without from 1 to 40% by weight of ethylene.

From the group of (meth)acrylate polymers, polymers of n-butyl acrylate or 2-ethylhexylacrylate; copolymers of methyl methacrylate with n-butyl acrylate and/or 2-ethylhexyl acrylate; copolymers of methyl methacrylate with n-butylacrylate and/or ethyl acrylate; copolymers of methyl methacrylate with 1,3-butadiene.

From the group of styrene polymers, styrene-butadiene copolymers and styrene-acrylate copolymers such as styrene-n-butyl acrylate or styrene-2-ethylhexyl acrylate with a styrene content of in each case from 10 to 70% by weight.

Maximum preference is given to polymerizing the monomers or monomer mixtures just mentioned in the presence of from 0.1 to 5% by weight of one or more auxiliary monomers from the group consisting of acrylic acid, methacrylic acid, acrylamide, methacrylamide, and hydroxyethyl, hydroxypropyl and hydroxybutyl acrylate.

In the case of preparation by the emulsion polymerization process the polymerization temperature is generally from 40° C. to 100° C., preferably from 60° C. to 90° C. In the case of the copolymerization of gaseous comonomers such as ethylene, 1,3-butadiene or vinyl chloride it is also possible to operate under pressure, generally between 5 bar and 100 bar. The make-up water is included in part in the initial charge and the remainder is metered in, the metered addition possibly taking place as part of the metering of the initiator and the metering of the emulsifier. The initial amount of water is such that the emulsifier fraction in the initial charge is from 0.001 to 0.5% by weight, based on the water fraction included in the initial charge.

The polymerization is initiated by means of the initiators or redox initiator combinations which are common for emulsion polymerization. Examples of suitable organic initiators are hydroperoxides such as tert-butyl hydroperoxide, tert-butyl peroxopivalate, cumene hydroperoxide, isopropylbenzene monohydroperoxide or azo compounds such as azobisisobutyronitrile. Suitable inorganic initiators are the sodium, potassium and ammonium salts of peroxodisulfuric acid. These initiators are used generally in an amount of from 0.05 to 3% by weight, based on the overall weight of the monomers.

As redox initiators use is made of combinations of the abovementioned initiators in combination with reducing agents. Suitable reducing agents are the sulfites and bisulfites of alkali metals and of ammonium, an example being sodium sulfite, the derivatives of sulfoxylic acid such as zinc or alkali metal formaldehyde-sulfoxylates, an example being sodium hydroxymethanesulfinate, and ascorbic acid. The amount of reducing agent is preferably from 0.01 to 5.0% by weight, based on the overall weight of the monomers.

In order to control the molecular weight it is possible to use regulators during the polymerization. They are used commonly in amounts of from 0.01 to 5.0% by weight, based on the monomers to be polymerized, and are metered in separately or else as a premix with reaction components. Examples of such regulators are n-dodecyl mercaptan, tert-dodecyl mercaptan, mercaptopropionic acid, methyl mercaptopropionate, isopropanol and acetaldehyde.

The polymerization mixture is stabilized by means of emulsifiers and/or protective colloids. Preference is given to stabilization by means of emulsifiers in order to obtain a low dispersion viscosity. The overall amount of emulsifier is preferably from 0.1 to 5% by weight, in particular from 0.5 to 3% by weight, based on the overall weight of the comonomers. Suitable emulsifiers are anionic or nonionic emulsifiers or mixtures thereof, examples being:

1) Alkyl sulfates, especially those having a chain length of 8 to 18 carbon atoms, alkyl and alkylaryl ether A sulfates having 8 to 18 carbon atoms in the hydrophobic radical and from 1 to 50 ethylene oxide units.

2) Sulfonates, especially alkyl sulfonates having 8 to 18 carbon atoms, alkylaryl sulfonates having 8 to 18 carbon atoms, diesters and monoesters of sulfosuccinic acid with monofunctional alcohols or alkylphenols having 4 to 15 carbon atoms in the alkyl radical; if desired, these alcohols or alkylphenols may also be ethoxylated with from 1 to 40 ethylene oxide units.

3) Phosphoric acid partial esters and their alkali metal and ammonium salts, especially alkyl and alkylaryl phosphates having 8 to 20 carbon atoms in the organic radical, alkyl ether and alkylaryl ether phosphates having 8 to 20 carbon atoms in the alkyl or alkylaryl radical and from 1 to 50 EO units.

4) Alkyl polyglycol ethers, preferably having from 8 to 40 EO units and alkyl radicals having 8 to 20 carbon atoms.
5) Alkylaryl polyglycol ethers, preferably having from 8 to 40 EO units and 8 to 20 carbon atoms in the alkyl and aryl radicals.
6) Ethylene oxide/propylene oxide (EO/PO) block copolymers, preferably having from 8 to 40 EO and/or PO units.

It is preferred to use mixtures of anionic emulsifiers and nonionic emulsifiers. Particular preference is given to mixtures of an diester or monoester of sulfosuccinic acid with monofunctional alcohols or alkylphenols having 4 to 15 carbon atoms in the alkyl radical, as anionic emulsifier, and as nonionic emulsifier an alkyl polyglycol ether preferably having from 8 to 40 EO units and alkyl radicals having 8 to 20 carbon atoms, in a weight ratio of from 8:1 to 1:8. In a further preferred embodiment, from 0.01 to 0.4% by weight of emulsifier, based on the overall weight of the water in the initial charge, is included in the initial charge prior to the beginning of polymerization.

If desired, the emulsifiers can also be used in a mixture with protective colloids. Examples of these are one or more protective colloids from the group consisting of partially hydrolyzed polyvinyl acetates, polyvinylpyrrolidones, carboxymethyl-, methyl-, hydroxyethyl- and hydroxypropyl-cellulose, starches, proteins, poly(meth)acrylic acid, poly(meth)acrylamide, polyvinylsulfonic acids, melamine-formaldehyde sulfonates, naphthalene-formaldehyde sulfonates, styrene-maleic acid copolymers and vinyl ether-maleic acid copolymers. If protective colloids are used, they are used preferably in an amount of from 0.01 to 1.0% by weight, based on the overall amount of the monomers. The protective colloids can be included in the initial charge prior to the beginning of polymerization, or can be metered in.

The monomers are included in the initial charge in a fraction of from 1 to 10% by weight and the remainder is metered in after the polymerization has been initiated. A preferred procedure is to include from 4 to 8% by weight in the initial charge, based in each case on the overall weight of the monomers, and to meter in the remainder. The fraction of auxiliary monomers, especially auxiliary monomers from the group of ethylenically unsaturated mono- and dicarboxylic acids, ethylenically unsaturated carboxamides and ethylenically unsaturated monomers having hydroxyl groups, is preferably not more than 5% by weight, based on the overall weight of the monomers included in the initial charge.

For initiating the polymerization, some of the initiator can be included in the initial charge and some metered in, or it can all be metered in. Preferably, the polymerization is started by heating the mixture to polymerization temperature and metering in the initiator, preferably in aqueous solution. The metered additions of emulsifier and monomers can be conducted separately or in the form of a mixture. In the case of the metered addition of mixtures of emulsifier and monomer, the procedure is to premix emulsifier and monomer in a mixer upstream of the polymerization reactor. Preferably, the remainder of emulsifier and the remainder of monomer not included in the initial charge are metered in separately from one another after the beginning of polymerization. Preferably, the metered addition is commenced from 15 minutes to 35 minutes after the beginning of polymerization.

When polymerization is at an end, residual monomer can be removed using known methods by postpolymerization, by means, for example, of postpolymerization initiated with redox catalyst. Volatile residual monomers can also be removed by means of distillation, preferably under reduced pressure, and with or without inert entraining gases such as air, nitrogen or steam being passed through or passed over the mixture.

The aqueous dispersions obtainable with the process have a solids content of more than 60% by weight, preferably from 65 to 75% by weight.

The aqueous dispersions of high solids content are suitable for use as textile binders, for use in coating compositions or in adhesive compositions. Preference is given to their use in adhesive compositions, with particular preference as pressure-sensitive adhesives.

The examples below serve to illustrate the invention further.

EXAMPLE 1

0.01% of Emulsifier Based on Water in Initial Charge

A 3 liter three-necked flask equipped with a reflux condenser and anchor stirrer was charged with 305.9 g of deionized water, 0.15 g of a 20% strength aqueous solution of a dialkyl sulfosuccinate as anionic emulsifier (AEROSOL MA), 0.02 g of a 40% strength aqueous solution of an isotridecylethoxylate containing 15 EO units as nonionic emulsifier (GENAPOL X-150) and 74 g of monomer mixture from feed stream 1 and this initial charge was heated to 75° C. under nitrogen with stirring (rotary speed 150 rpm). At this temperature the initiator solution (0.94 g of potassium peroxodisulfate in 20.4 g of water) was introduced into the reactor in order to initiate the polymerization. 30 minutes after the beginning of polymerization, the metered addition of monomers (feed stream 1), emulsifiers (feed stream 2) and initiator solution (feed stream 3) was commenced from separate vessels. The metering times were 4 hours for feed streams 1 and 2 and 4.5 hours for feed stream 3.

| Feed stream 1 (monomer mixture) | |
|---|---|
| Acrylic acid | 14.6 g |
| Hydroxyethyl acrylate | 14.6 g |
| Butyl acrylate | 1280 g |
| Ethyl acrylate | 87.4 g |
| Methyl methacrylate | 58.3 g |
| Dodecyl mercaptan | 0.3 g |
| Feed stream 2 (emulsifier mixture) | |
| Water | 135 g |
| Aerosol MA (as 20% strength solution) | 82.3 g |
| Genapol X-150 (as 40% strength solution) | 10.5 g |
| Feed stream 3 (initiator solution) | |
| Water | 102 g |
| Potassium peroxodisulfate | 3.9 g |

After the metered additions, polymerization was continued at 75° C. for 2 hours. After cooling, the pH was adjusted to 4.5 using ammonia solution. The resulting dispersion was virtually free from gel specks according to microscopic analysis and had a solids content of 70% by weight and a Brookfield viscosity of 236 mPas at 20 rpm.

EXAMPLE 2

0.07% Emulsifier Based on Water in Initial Charge

As in Example 1, but the amount of emulsifier in the initial charge was increased (AEROSOL MA 1.1 g and GENAPOL X-150 0.1 g).

After cooling, the pH was adjusted to 4.5 using ammonia solution. The resulting dispersion was virtually free from gel specks according to microscopic analysis and had a solids content of 70% by weight and a Brookfield viscosity of 438 mPas at 20 rpm.

EXAMPLE 3

0.32% Emulsifier Based on Water in Initial Charge

As in Example 1, but the amount of emulsifier in the initial charge was increased (AEROSOL MA 4.5 g and GENAPOL X-150 0.4 g)

After cooling, the pH was adjusted to 4.5 using ammonia solution. The resulting dispersion was virtually free from gel specks according to microscopic analysis and had a solids content of 70% by weight and a Brookfield viscosity of 1160 mPas at 20 rpm.

COMPARATIVE EXAMPLE 4

0.57% of Emulsifier Based on Water in Initial Charge

As in Example 1, but the amount of emulsifier in the initial charge was increased further (AEROSOL MA 7.5 g and GENAPOL X-150 0.95 g).

Under these conditions, the viscosity increased so greatly during the polymerization that it was necessary to terminate the polymerization.

EXAMPLE 5

0.4% of Emulsifier Based on Water in Initial Charge

A 3 liter three-necked flask equipped with a reflux condenser and anchor stirrer was charged with 326 g of deionized water, 5.7 g of a 20% strength aqueous solution of a dialkyl sulfosuccinate as anionic emulsifier (AEROSOL MA), 0.5 g of a 40% strength aqueous solution of an isotridecylethoxylate containing 15 EO units as nonionic emulsifier (GENAPOL X-150), 0.94 g of potassium peroxide disulfate and 74 g of monomer mixture from feed stream 1 and this initial charge was heated to 75° C. under nitrogen with stirring (rotary speed 150 rpm). Polymerization was conducted at 75° C. for 30 minutes, and then the metered addition of monomers (feed stream 1), emulsifiers (feed stream 2) and initiator solution (feed stream 3) was commenced from separate vessels. The metering times were 4 hours for feed streams 1 and 2 and 4.5 hours for feed stream 3.

| Feed stream 1 (monomer mixture): | |
|---|---|
| Acrylic acid | 29.1 g |
| Butyl acrylate | 1340 g |
| Methyl methacrylate | 87.3 g |
| Dodecyl mercaptan | 0.74 g |
| Feed stream 2 (emulsifier mixture): | |
| Water | 93.2 g |
| Aerosol MA (as 20% strength solution) | 118.7 g |
| Genapol X-150 (as 40% strength solution) | 10.1 g |
| Feed stream 3 (initiator solution) | |
| Water | 101.9 g |
| Potassium peroxodisulfate | 3.9 g |

After the metered additions, polymerization was continued at 75° C. for about 2 hours. After cooling, the pH was adjusted to 4.5 using ammonia solution. The resulting dispersion was virtually free from gel specks according to microscopic analysis and had a solids content of 70% by weight and a Brookfield viscosity of 1120 mPas at 20 rpm.

COMPARATIVE EXAMPLE 6

0.64% of Emulsifier Based on Water in Initial Charge

As in Example 5, but the amount of emulsifier in the initial charge was increased (AEROSOL MA 9.0 g and GENAPOL X-150 0.76 g).

Under these conditions, the viscosity increased so greatly during the polymerization that it was necessary to terminate the polymerization.

COMPARATIVE EXAMPLE 7

0.0% Emulsifier Based on Water in Initial Charge

The procedure followed was similar to that of Example 5 with the difference that no emulsifier was included in the initial charge and the total amount of emulsifier was metered in. Under these conditions, a dispersion having a high level of gel specks was obtained.

What is claimed is:

1. A process for preparing aqueous polymer dispersions having a solids content of more than 60% by weight by polymerizing at least one ethylenically unsaturated monomer by free-radical initiated aqueous emulsion polymerization in the presence of from 0.1 to 5.0% by weight of emulsifier, based on the overall weight of the monomers, and in the presence of initiator, wherein the emulsifier in an amount of from 0.001 to 0.5% by weight, based on the overall weight of the water in the initial charge, is included in the initial charge together with a fraction of from 1 to 10% by weight of the monomers, based on the overall weight of the monomers, before the beginning of polymerization, and the remainder of emulsifier and the remainder of monomers are metered in after the beginning of polymerization, with the proviso that the polymerization is conducted in the absence of a seed latex.

2. The process as claimed in claim 1, wherein the monomers comprises at least one monomer selected from the group, consisting of vinyl esters of branched or unbranched carboxylic acids having from 1 to 12 carbon atoms, esters of acrylic acid and methacrylic acid with branched or unbranched alcohols having 1 to 12 carbon atoms, vinyl aromatics, vinyl halides, olefins, and dienes.

3. The process as claimed in claim 1, wherein polymerization is carried out in the presence of from 0.05 to 10% by weight, based on the overall weight of the monomer mixture, of at least one auxiliary monomer selected from the group consisting of ethylenically unsaturated mono- and dicarboxylic acids, ethyleneically unsaturated carboxamides, and ethylenically unsaturated monomers having hydroxyl groups.

4. The process as claimed in claim 1, wherein the monomers and the weight fractions of the comonomers are selected so as to provide copolymer with a glass transition temperature Tg of from −70° C. to +100° C.

5. The process as claimed in claim 1, wherein the emulsifier comprises at least one member selected from the group consisting of anionic emulsifiers, and nonionic emulsifiers.

6. The process as claimed of claim 1, wherein a fraction of auxiliary monomers selected from the group consisting of ethylenically unsaturated mono- and dicarboxylic acids, ethylenically unsaturated carboxamides and ethylenically unsaturated monomers having hydroxyl groups is not more than 5% by weight, based on the overall weight of the monomers included in the initial charge.

7. The process of claim 2, wherein polymerization is carried out in the presence of from 0.05 to 10% by weight, based on the overall weight of the monomer mixture, of at least one auxiliary monomer selected from the group consisting of ethylenically unsaturated mono- and dicarboxylic acids, ethylenically unsaturated carboxamides, and ethylenically unsaturated monomers having hydroxyl groups.

8. The process of claim 3, wherein the monomers and the weight fractions of the comonomers are selected so as to provide copolymer with a glass transition temperature Tg of from −70° C. to +100° C.

9. The process of claim 2, wherein the emulsifier comprises at least one member selected from the group consisting of anionic, emulsifiers, and nonionic emulsifiers.

10. The process of claim 2, wherein a fraction of auxiliary monomers selected from the group consisting of ethylenically unsaturated mono- and dicarboxylic acids, ethylenically unsaturated carboxamides and ethylenically unsaturated monomers having hydroxyl groups is not more than 5% by weight, based on the overall weight of the monomers included in the initial charge.

11. The process of claim 3, wherein the monomers and the weight fractions of the comonomers are selected so as to provide copolymer with a glass transition temperature Tg of from −70° C. to +100° C.

12. The process of claim 3, wherein the emulsifier comprises at least one member selected from the group consisting of anionic emulsifiers, and nonionic emulsifiers.

13. The process of claim 3, wherein a fraction of auxiliary monomers selected from the group consisting of ethylenically unsaturated mono- and dicarboxylic acids, ethylenically unsaturated carboxamides and ethylenically unsaturated monomers having hydroxyl groups is not more than 5% by weight, based on the overall weight of the monomers included in the initial charge.

14. The process of claim 4, wherein the emulsifier comprises at least one member selected from the group consisting of anionic emulsifiers, and nonionic emulsifiers.

15. The process of claim 4, wherein a fraction of auxiliary monomers selected from the group consisting of ethylenically unsaturated mono- and dicarboxylic acids, ethylenically unsaturated carboxamides and ethylenically unsaturated monomers having hydroxyl groups is not more than 5% by weight, based on the overall weight of the monomers included in the initial charge.

16. The process of claim 5, wherein a fraction of auxiliary monomers selected from the group consisting of ethylenically unsaturated mono- and dicarboxylic acids, ethylenically unsaturated carboxamides and ethylenically unsaturated monomers having hydroxyl groups is not more than 5% by weight, based on the overall weight of the monomers included in the initial charge.

\* \* \* \* \*